United States Patent
Nakayama

(10) Patent No.: US 8,521,943 B2
(45) Date of Patent: Aug. 27, 2013

(54) DATA TRANSMISSION SYSTEM AND METHOD OF READING DATA

(75) Inventor: Eiji Nakayama, Daito (JP)

(73) Assignee: Kyocera Corporation, Kyoto (JP)

( * ) Notice: Subject to any disclaimer, the term of this patent is extended or adjusted under 35 U.S.C. 154(b) by 175 days.

(21) Appl. No.: 13/255,682

(22) PCT Filed: Mar. 4, 2010

(86) PCT No.: PCT/JP2010/053515
§ 371 (c)(1),
(2), (4) Date: Sep. 9, 2011

(87) PCT Pub. No.: WO2010/103987
PCT Pub. Date: Sep. 16, 2010

(65) Prior Publication Data
US 2012/0005399 A1     Jan. 5, 2012

(30) Foreign Application Priority Data
Mar. 10, 2009 (JP) .................. 2009-056860

(51) Int. Cl.
*G06F 13/00* (2006.01)
(52) U.S. Cl.
USPC ........................... 710/316; 710/310; 710/313
(58) Field of Classification Search
USPC ..................... 710/33, 306, 310, 313, 316
See application file for complete search history.

(56) References Cited

U.S. PATENT DOCUMENTS
2007/0280278 A1* 12/2007 Ezawa et al. .................. 370/412

FOREIGN PATENT DOCUMENTS
JP    A-2000-250846    9/2000
JP    A-2004-234150    8/2004

OTHER PUBLICATIONS

Oct. 18, 2011 Translation of International Preliminary Report issued in International Patent Application No. PCT/JP2010/053515.
RapidIO Interconnect Specification Part 1: Input/Output Logical Specification Rev. 1.3, Jun. 2005 (http://www.rapidio.org/zdata/specs/IO_logical.pdf).
International Search Report mailed Jun. 8, 2010 issued in International Patent Application No. PCT/JP2010/053515 (with translation).

* cited by examiner

*Primary Examiner* — Glenn A Auve
(74) *Attorney, Agent, or Firm* — Oliff & Berridge, PLC

(57) ABSTRACT

In a request issuing device, a specific read request unit generates a read requesting write packet including a predetermined address of a memory of a request receiving device as a write address and including, as a read address, the address of the memory in a payload. In the request receiving device, when data is written into the predetermined address of the memory, a specific read request responding unit detects reception of the read request, reads the data from the read address of the memory written into the predetermined address, and generates a read responding write packet including, in the payload, the data that has been read.

8 Claims, 9 Drawing Sheets

DATA TRANSMISSION SYSTEM AND METHOD OF READING DATA

TECHNICAL FIELD

The present invention relates to a data transmission system and a method of reading the data, and particularly to a data transmission system having a plurality of devices connected through a serial bus to a switch performing priority control in accordance with the type of a packet, and a method of reading the data.

BACKGROUND ART

The amount of communication data handled in radio base stations has been dramatically increased in recent years. This causes an increase in signal throughput in the device such as a CPU (Central Processing Unit), a DSP (Digital Signal Processor) and an FPGA (Field Programmable Gate Array) within the substrate performing the process in the radio base station. Consequently, the communication speed between these devices has also been increased.

Serial RapidIO (registered trademark) is one of the specifications for which the above-mentioned various devices within the substrate are connected to a switch through a serial line to allow high speed communication up to 10 Gbps between the devices (for example, see RapidIO™ Interconnect Specification Part 1:Input/Output Logical Specification Rev1.3 (Non-Patent Literature 1)). The devices in the radio base station conforming to the specifications for Serial RapidIO (registered trademark) are also being put into practical use.

Serial RapidIO (registered trademark) defines the packet used for communication. For example, the packet of NREAD type is a read packet for requesting the device on the other end to read the data. Furthermore, the packet of NWRITE type is a write packet applied for writing the data into the device on the other end.

CITATION LIST

Non Patent Literature

NPL RapidIO™ Interconnect Specification Part 1: Input/Output Logical Specification Rev, 1.3, June 2005. Internet (URL: http://www.rapidio.org/zdata/specs/IO_logical.pdf)

SUMMARY OF INVENTION

Technical Problem

In the case of Serial RapidIO (registered trademark), the write packet is set higher in priority than the read packet that is transferred from the same device as that of the write packet and transferred to the same device as that of the write packet.

FIG. 9 is a diagram for illustrating a conventional example of packet transmission.

Referring to FIG. 9, assuming that a device A is a transfer source device and a device B is a transfer destination device, a write packet NWRITE (1), a write packet NWRITE (2), a read packet NREAD (1), a write packet NWRITE (3), and a write packet NWRITE (4) are sequentially output from device A, input into a multiport switch 1, and accumulated in a buffer within multiport switch 1.

Write packets NWRITE (3) and NWRITE (4) are input into multiport switch 1 at the time after read packet NREAD (1) is input. In spite of this, since the write packet is higher in priority than the read packet, multiport switch 1 extracts write packets NWRITE (3) and NWRITE (4) from the buffer prior to read packet NREAD (1), and outputs these write packets to device B. Read packet NREAD (1) is not output from the buffer until there is no longer a write packet in the buffer of multiport switch 1 that is transferred from device A and is to be transferred to device B.

However, data communication is often continuously carried out between the devices that process radio communication. Thus, there may be a case where a read packet is inserted between a number of write packets. In such a case, the read packets remain accumulated in buffer 2 of multiport switch 1, which poses a problem that the read request is delivered to the destination device with a significant delay.

Accordingly, the present invention is directed to provide a data transmission system and a method of reading data that allow a read request to be delivered to the destination device without delay even in the case where the read packet is lower in transmission priority than the write packet.

Solution to Problem

A data transmission system according to an aspect of the present invention includes a multiport switch, and a first device and a second device each connected to a port of the multiport switch through one or more serial buses. The multiport switch includes a buffer, and a priority control unit, when the buffer includes a write packet and a read packet which are transferred to an identical transfer destination and transferred from an identical transfer source, providing an output of the write packet by priority. The first device and the second device each include a memory, an output unit providing an output of a generated packet to the multiport switch, a receiving unit receiving the packet from the multiport switch, and a write processing unit writing data included in a payload of the received write packet into an address of the memory designated in a write address included in the received write packet. The first device includes a read request unit generating a read requesting write packet including a predetermined address of the memory of the second device as a write address and including a read address of the memory of the second device in the payload. The second device includes a read response unit detecting reception of a read request when the data is written into the predetermined address of the memory, reading the data from the read address of the memory written into the predetermined address, and generating a read responding write packet including, in the payload, the data that has been read.

Preferably, in the first device, the read request unit generates the read requesting write packet further including a read size in the payload. In the second device, the read response unit reads the data from the memory by the read size written into the predetermined address of the memory, and generates the read responding write packet including the data read by the read size in the payload.

Preferably, in the first device, the read request unit generates the read requesting write packet further including, in the payload, the address of the memory of the first device into which the data having been read is written. In the second device, the read response unit generates the read responding write packet including, as the write address, the address of the memory of the first device written into the predetermined address of the memory.

Preferably, in the second device, the read response unit generates an interrupt packet providing notification of completion of a response to the detected read request after generation of the read responding write packet.

Preferably, in the first device, when receiving the interrupt packet, the read request unit detects completion of the response to the read request.

Preferably, an interrupt wiring is further connected between the first device and the second device. In the second device, the read response unit provides notification of completion of a response to the detected read request through the interrupt wiring after generation of the read responding write packet.

Preferably, in the first device, when receiving the notification of completion of the response to the detected read request through the interrupt wiring, the read request unit detects completion of the response to the read request.

A method of transmitting data according to an aspect of the present invention provides a method of reading data in a data transmission system including a multiport switch, and a first device and a second device each connected to a port of the multiport switch through one or more serial buses. The multiport switch includes a buffer, and a priority control unit, when the buffer includes a write packet and a read packet that are transferred to an identical transfer destination and transferred from an identical transfer source, providing an output of the write packet by priority. The method of reading data includes the steps of: the first device generating a read requesting write packet including a predetermined address of a memory of the second device as a write address and including a read address of the memory of the second device in a payload; the first device transmitting the generated read requesting write packet to the second device through the multiport switch; the second device receiving the read requesting write packet; the second device writing data included in the payload of the received read requesting write packet into an address of the memory designated in the write address included in the received read requesting write packet; when the data is written into the predetermined address of the memory, the second device detecting reception of a read request, reading the data from the read address of the memory written into the predetermined address, and generating a read responding write packet including, in the payload, the data that has been read; the second device transmitting the generated read responding write packet to the first device through the multiport switch; and the first device receiving the read responding write packet.

Advantageous Effects of Invention

According to the present invention, even in the case where the read packet is lower in transmission priority than the write packet, the read request can be delivered to the destination device without delay.

DESCRIPTION OF EMBODIMENTS

The embodiments of the present invention will be hereinafter described with reference to the drawings.

[Configuration of Data Transmission System]

Figure 1:
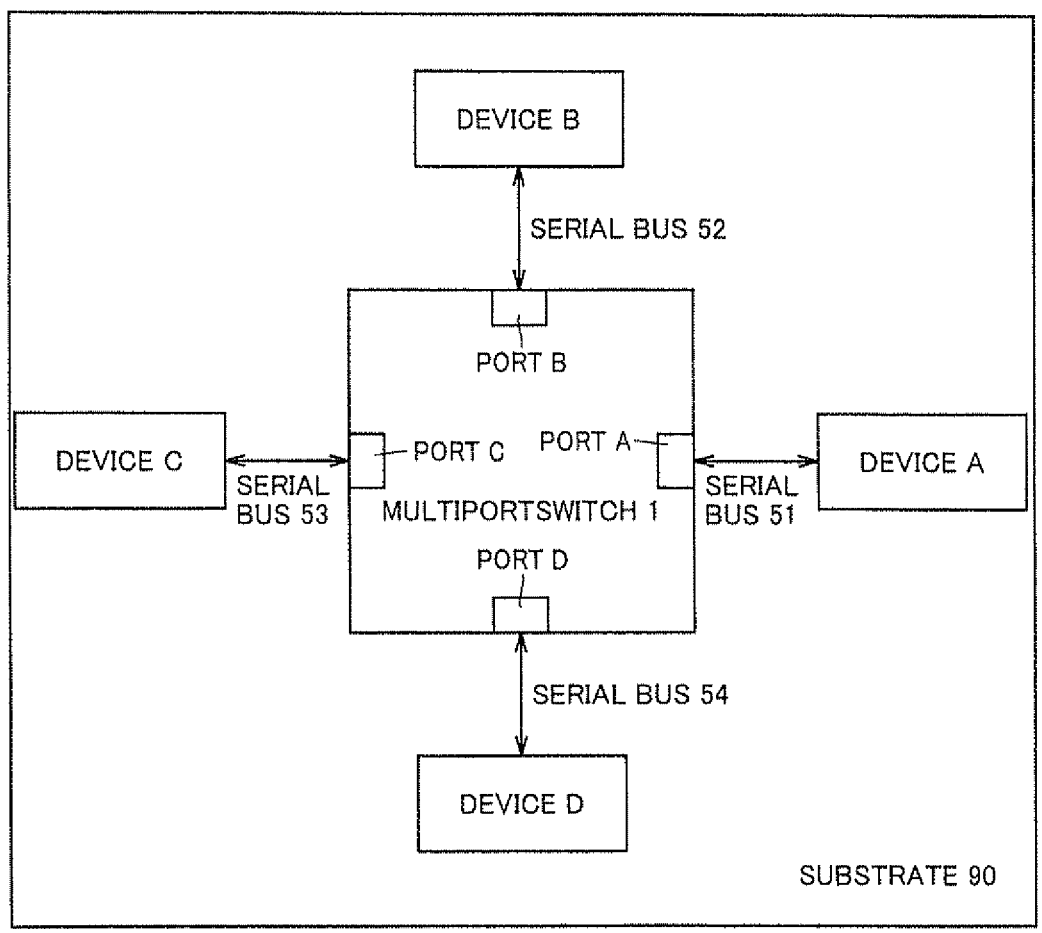
FIG. 1 is a diagram showing a data transmission system according to the embodiment of the present invention.

FIG. 1 is a diagram showing a data transmission system according to the embodiment of the present invention.

Referring to FIG. 1, this data transmission system has a configuration in which a plurality of devices A to D and a multiport switch 1 are mounted on a substrate 90. Device A is connected to a port A of multiport switch 1 through a serial bus 51. Device B is connected to a port B of multiport switch 1 through a serial bus 52. Device C is connected to a port C of multiport switch 1 through a serial bus 53. Device D is connected to a port D of multiport switch 1 through a serial bus 54.

[Outline of Processing According to Embodiment of the Present Invention]

Figure 2:
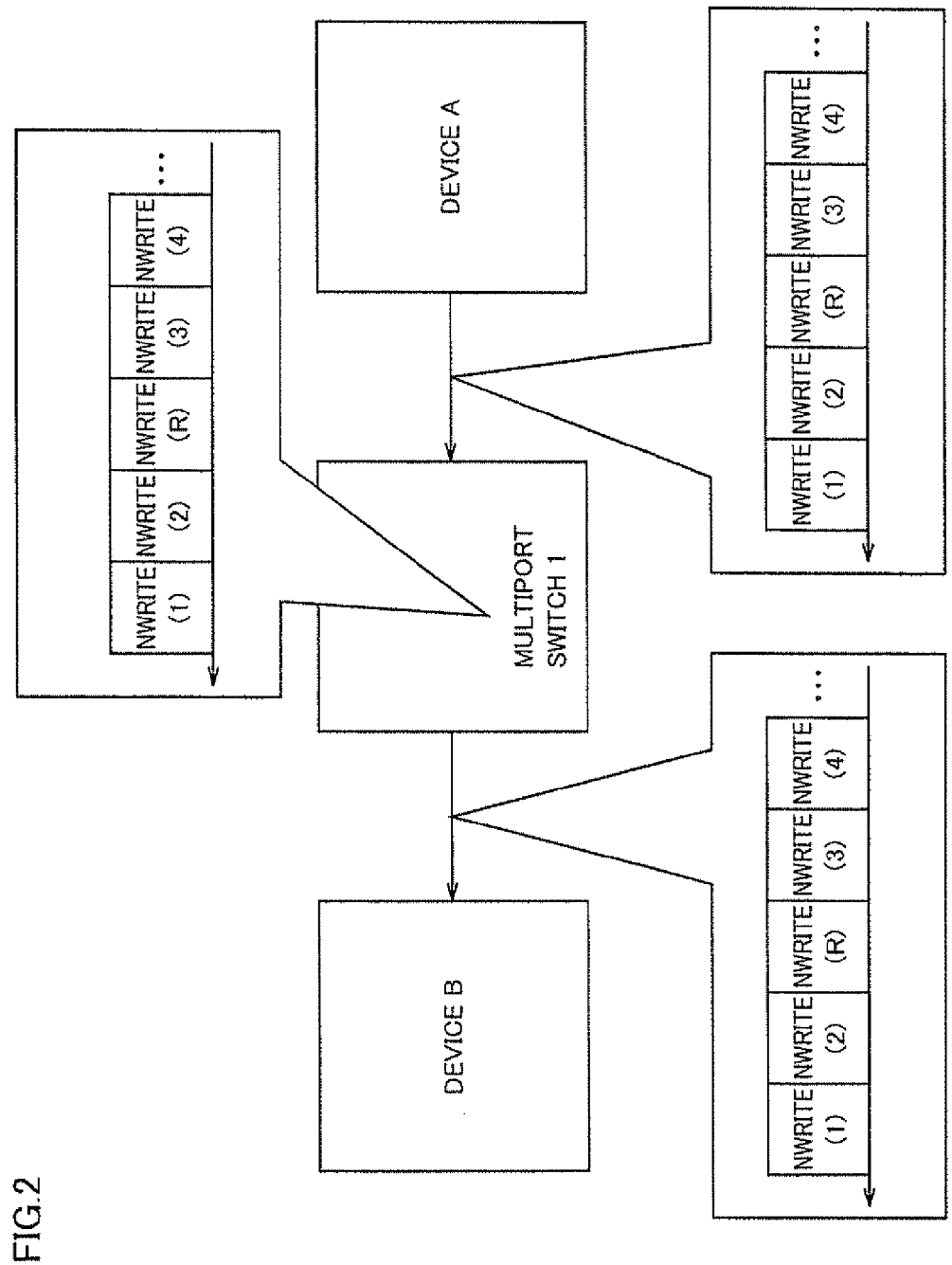
FIG. 2 is a diagram for illustrating an example of packet transmission according to the embodiment of the present invention.

FIG. 2 is a diagram for illustrating an example of packet transmission according to the embodiment of the present invention.

Referring to FIG. 2, assuming that device A is a transfer source device and device B is a transfer destination device, a write packet NWRITE (1), a write packet NWRITE (2), a read requesting write packet NWRITE (R), a write packet NWRITE (3), and a write packet NWRITE (4) are sequentially output from device A, input into multiport switch 1, and accumulated in the buffer within multiport switch 1. Read requesting write packet NWRITE (R) has a configuration of a write packet, but serves to request transfer destination device B to read the data. The details of this packet will be described later.

Since read requesting write packet NWRITE (R) serves as a write packet, it is identical in priority to subsequent NWRITE (3) and NWRITE (4). Therefore, the output order is not changed. Accordingly, multiport switch 1 extracts read requesting write packet NWRITE (R) from the buffer subsequent to write packet NWRITE (2), and outputs the same to device B.

[Configuration of Device and Multiport Switch]

Figure 3:
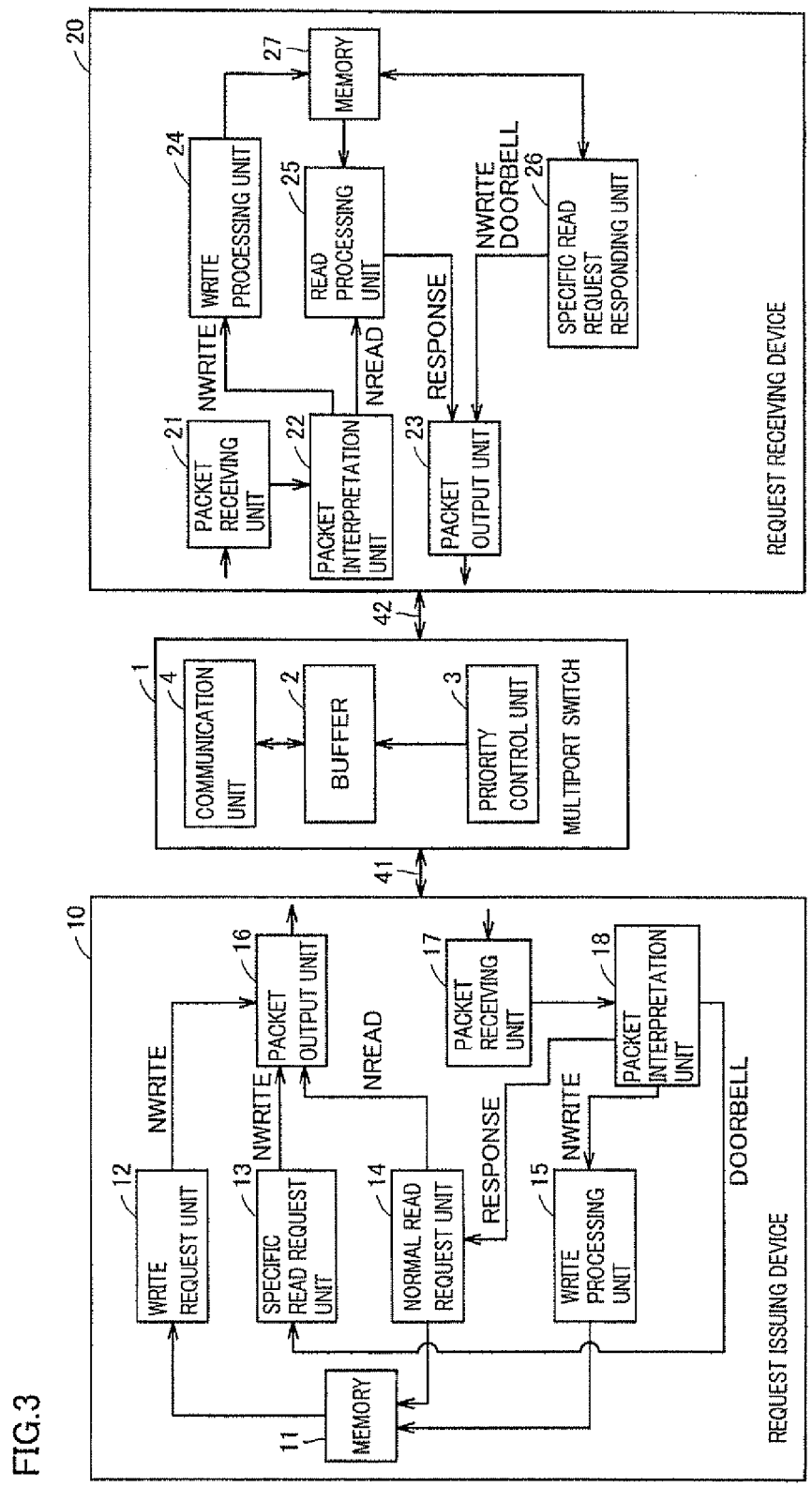
FIG. 3 is a diagram showing the configuration of a request issuing device issuing a request, a switch and a request receiving device receiving the request.

FIG. 3 is a diagram showing the configuration of a request issuing device issuing a request, a multiport switch and a request receiving device receiving the request. It is assumed that the request issuing device is, for example, device A in FIG. 1 and the request receiving device is, for example, device B in FIG. 1.

Referring to FIG. 3, a serial bus 41 is connected between a request issuing device 10 and multiport switch 1. A serial bus 42 is connected between multiport switch 1 and a request receiving device 20.

Request issuing device 10 includes a memory 11, a write request unit 12, a normal read request unit 14, a specific read request unit 13, a write processing unit 15, a packet output unit 16, a packet receiving unit 17, and a packet interpretation unit 18.

Packet output unit 16 outputs the generated packet to multiport switch 1 through the serial bus.

Packet receiving unit 17 receives the packet output from multiport switch 1 through the serial bus.

Packet interpretation unit 18 refers to the transaction type of the received packet to interpret whether the received packet corresponds to a write packet (NWRITE), a response packet (RESPONSE) or an interrupt packet (DOORBELL). When the received packet is a write packet, packet interpretation unit 18 outputs the received packet to write processing unit 15. When the received packet is a response packet, packet interpretation unit 18 outputs the received packet to normal read request unit 14. When the received packet is an interrupt packet, packet interpretation unit 18 outputs the received packet to specific read request unit 13.

The write data included in the payload of the received write packet is written into memory 11.

Write request unit 12 generates a write packet designating the address of a memory 27 of request receiving device 20 in the write address portion, designating the size of the write data in the write size portion, and including write data in the payload.

Normal read request unit 14 generates a read packet designating the address of memory 27 of request receiving device 20 in the read address portion and designating the size of the read data in the read size portion. Normal read request unit 14 extracts the read data from the payload of the response packet that is transmitted from request receiving device 20 in response to the read packet.

Specific read request unit 13 generates a read requesting write packet designating the predetermined address (fixed address) of memory 27 of request receiving device 20 in the write address portion, including the address of memory 27 of request receiving device 20 in the payload as a read address, including the size of the read data read from the read address of memory 27 as a read size, and including the address of memory 11 of request issuing device 10 as a write address of the read data that has been read. Furthermore, when receiving the interrupt packet from request receiving device 20, specific read request unit 13 detects completion of the response to the specific read request.

Write processing unit 15 writes the data included in the payload of the received write packet into the address of memory 11 designated in the write address portion of the received write packet.

Multiport switch 1 includes a communication unit 4, a buffer 2, and a priority control unit 3.

Communication unit 4 receives the packet output from device 10 or 20, and outputs the packet to buffer 2. Furthermore, communication unit 4 transmits the packet accumulated in buffer 2 to device 10 or 20.

The packets output from one of the devices are accumulated in buffer 2. Then, when the other of the devices becomes capable of receiving the packets, buffer 2 outputs the packets.

When buffer 2 includes a write packet and a read packet that are transferred to the same transfer destination and transferred from the same transfer source, priority control unit 3 provides an output of the write packet by priority. In accordance with the transaction type included in the packet, priority control unit 3 identifies the packets in buffer 2 as a write packet (NWRITE) or a read packet (NREAD).

Request receiving device 20 includes a memory 27, a packet receiving unit 21, a packet interpretation unit 22, a packet output unit 23, a write processing unit 24, a read processing unit 25, and a specific read request responding unit 26.

Packet output unit 23 outputs the generated packet to multiport switch 1 through the serial bus.

Packet receiving unit 21 receives the packet output from multiport switch 1 through the serial bus.

Packet interpretation unit 22 refers to the transaction type of the received packet to interpret the received packet as a write packet (NWRITE) or a read packet (NREAD). When the received packet is a write packet, packet interpretation unit 22 outputs the received packet to write processing unit 24. When the received packet is a read packet, packet interpretation unit 22 outputs the received packet to read processing unit 25.

The write data included in the payload of the write packet output from request issuing device 10 is written into memory 27. Furthermore, the read data read from memory 27 is embedded in the payload of the response packet or the read responding write packet output to request issuing device 10.

Write processing unit 24 writes the write data included in the payload, by the size designated in the write size portion, into the address of memory 27 designated in the write address portion of the received write packet.

Read processing unit 25 reads the data from memory 27 by the size designated in the read size portion based on the address of memory 27 as the starting point that is designated in the read address portion of the received packet. Read processing unit 25 generates a response packet including, in the payload, the read data that has been read.

When the data is written into the predetermined address of memory 27, specific read request responding unit 26 detects reception of the read request, and reads a read address (a) of memory 27 written into the predetermined address of memory 27, a read size (b) and a write address (c) of memory 11. Specific read request responding unit 26 reads the data from read address (a) of memory 27 by read size (b). Specific read request responding unit 26 generates a read responding write packet including, in the write address portion, the write address (c) of memory 11 that has been read and including, in the payload, the read data that has been read. Specific read request responding unit 26 further generates an interrupt packet after generation of the read responding write packet.

[Configuration of Packet]

Figure 4:
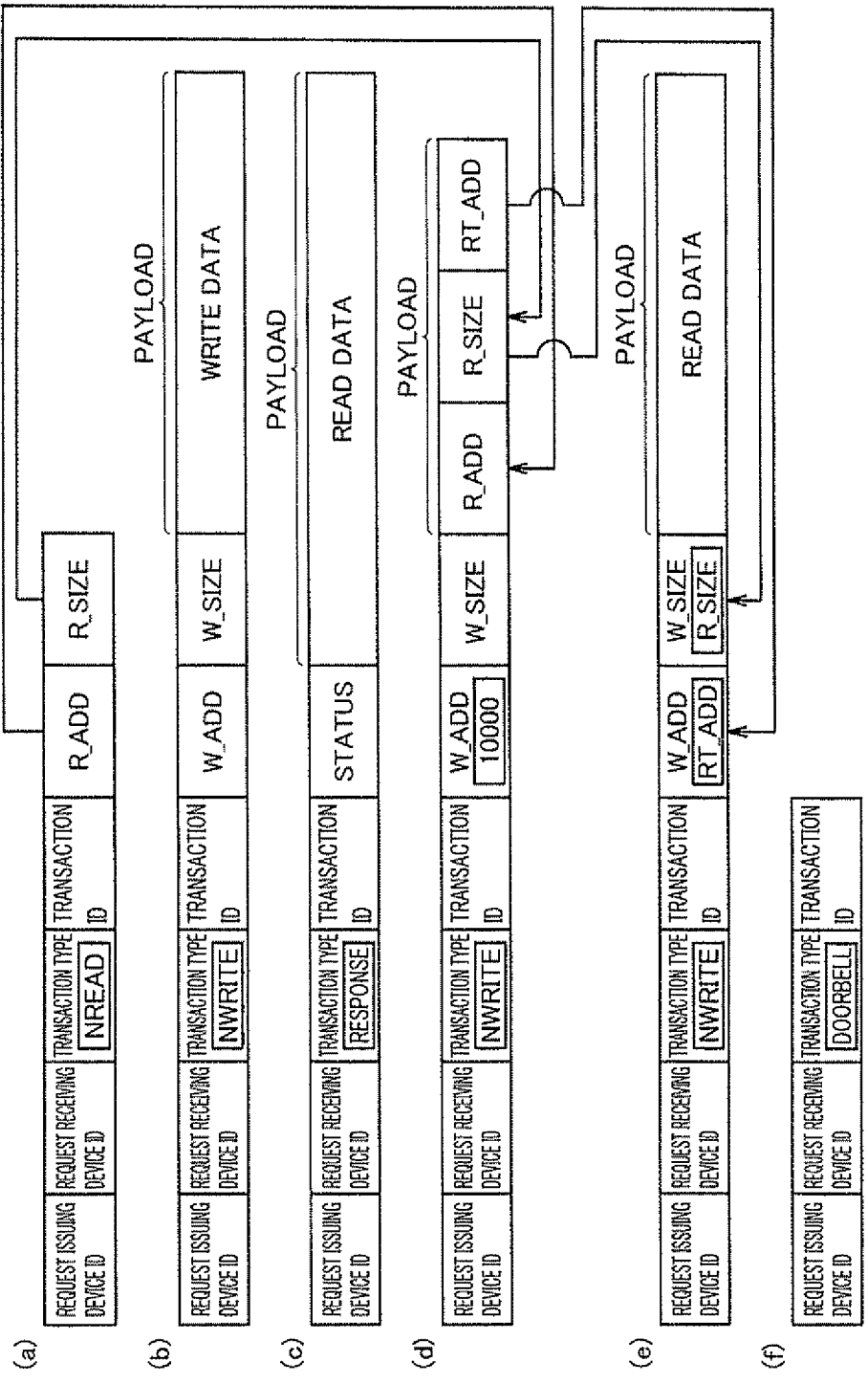
FIG. 4 is a diagram showing the configuration of a packet according to the embodiment of the present invention.

FIG. 4 is a diagram showing the configuration of the packet according to the embodiment of the present invention. These packets comply with Serial RapidIO (registered trademark) specifications.

FIG. 4(*a*) is a diagram showing the configuration of a read packet. This read packet is transmitted when a normal read request is issued.

Referring to FIG. 4(*a*), the read packet includes a request issuing device ID, a request receiving device ID, a transaction type, a transaction ID, R_ADD, and R_SIZE. An ID for identifying the device having issued the normal read request is described in the request issuing device ID. An ID for identifying the device receiving the normal read request is described in the request receiving device ID. NREAD is described in the transaction type. An ID for identifying this packet is described in the transaction ID. Described in R_ADD (read address portion) is the memory address of the request receiving device from which the data is read. Also described in R_SIZE (read size portion) is the number of bytes of data that is to be read based on the memory address designated in R_ADD as the starting point.

FIG. 4(*b*) is a diagram showing the configuration of a normal write packet. This normal write packet is transmitted when the write request is issued.

Referring to FIG. 4(*b*), the normal write packet includes a request issuing device ID, a request receiving device ID, a transaction type, a transaction ID, W_ADD, W_SIZE, and write data. An ID for identifying the device having issued the write request is described in the request issuing device ID. An ID for identifying the device receiving the write request is described in the request receiving device ID. NWRITE is described in the transaction type. An ID for identifying this packet is described in the transaction ID. Described in W_ADD (write address portion) is the memory address of request receiving device 20 into which the data of the payload is written. Also described in W_SIZE (write size portion) is the number of bytes of data that is to be written based on the memory address designated in W_ADD as the starting point. The payload includes write data.

FIG. 4(c) is a diagram showing the configuration of a response packet. This response packet is transmitted when a reply (response) is made to the normal read request.

Referring to FIG. 4(c), the response packet includes a request issuing device ID, a request receiving device ID, a transaction type, a status, and read data. An ID for identifying the device have issued a response, that is, the device having received the normal read request, is described in the request issuing device ID. An ID for identifying the device receiving the response, that is, the device having issued the normal read request, is described in the request receiving device ID. RESPONSE is described in the transaction type. An ID for identifying this packet is described in the transaction ID. It is described in the status as to whether processing by the normal read request, that is, the read processing, was normally performed. The payload includes the read data obtained by the read processing.

FIG. 4(d) is a diagram showing the configuration of a read requesting write packet. This read requesting write packet is transmitted when a specific read request is issued.

Referring to FIG. 4(d), the read requesting write packet includes a request issuing device ID, a request receiving device ID, a transaction type, a transaction ID, W_ADD, and W_SIZE. An ID for identifying the device having issued the specific read request is described in the request issuing device ID. An ID for identifying the device receiving the specific read request is described in the request receiving device ID. NWRITE is described in the transaction type. An ID for identifying this packet is described in the transaction ID. Also described in W_ADD (write address portion) is the memory address of the request receiving device into which the data of the payload is written. In the read requesting write packet, W_ADD exhibits a predetermined value "10000." Described in W_SIZE (write size portion) is the number of bytes of data that is to be written based on the memory address designated in W_ADD as the starting point. Furthermore, the read requesting write packet includes R_ADD, R_SIZE and RT_ADD in the payload. Described in R_ADD is the memory address of the request receiving device from which the data is read. Described in R_SIZE is the number of bytes of data that is to be read based on the memory address designated in R_ADD as the starting point. Also described in RT_ADD is the memory address of the request issuing device into which the read data is written.

FIG. 4(e) is a diagram showing the configuration of a read responding write packet. This read responding write packet is transmitted when a reply (response) is made to the specific read request.

Referring to FIG. 4(e), the read responding write packet includes a request issuing device ID, a request receiving device ID, a transaction type, a transaction ID, W_ADD, W_SIZE, and read data. An ID for identifying the device having issued the response to the specific read request is described in the request issuing device ID. An ID for identifying the device receiving the response to the specific read request is described in the request receiving device ID. NWRITE is described in the transaction type. An ID for identifying this packet is described in the transaction ID. Also described in W_ADD (write address portion) is the memory address of the request receiving device into which the data of the payload is written. RT_ADD included in the read requesting write packet is described in the read responding write packet. Described in W_SIZE (write size portion) is the number of bytes of data that is to be written based on the memory address designated in W_ADD as the starting point, R_SIZE included in the read requesting write packet is described in the read responding write packet. The payload includes the read data obtained by the read processing.

FIG. 4(f) is a diagram showing the configuration of an interrupt packet. This interrupt packet is transmitted when providing interrupt notification of completion of the response to the specific read request.

Referring to FIG. 4(f), the interrupt packet includes a request issuing device ID, a request receiving device ID, a transaction type, and a transaction ID. An ID for identifying the device having issued the interrupt notification is described in the request issuing device ID. An ID for identifying the device receiving interrupt notification is described in the request receiving device ID. DOORBELL is described in the transaction type. An ID for identifying this packet is described in the transaction ID.

[Normal Write Operation]

Figure 5:
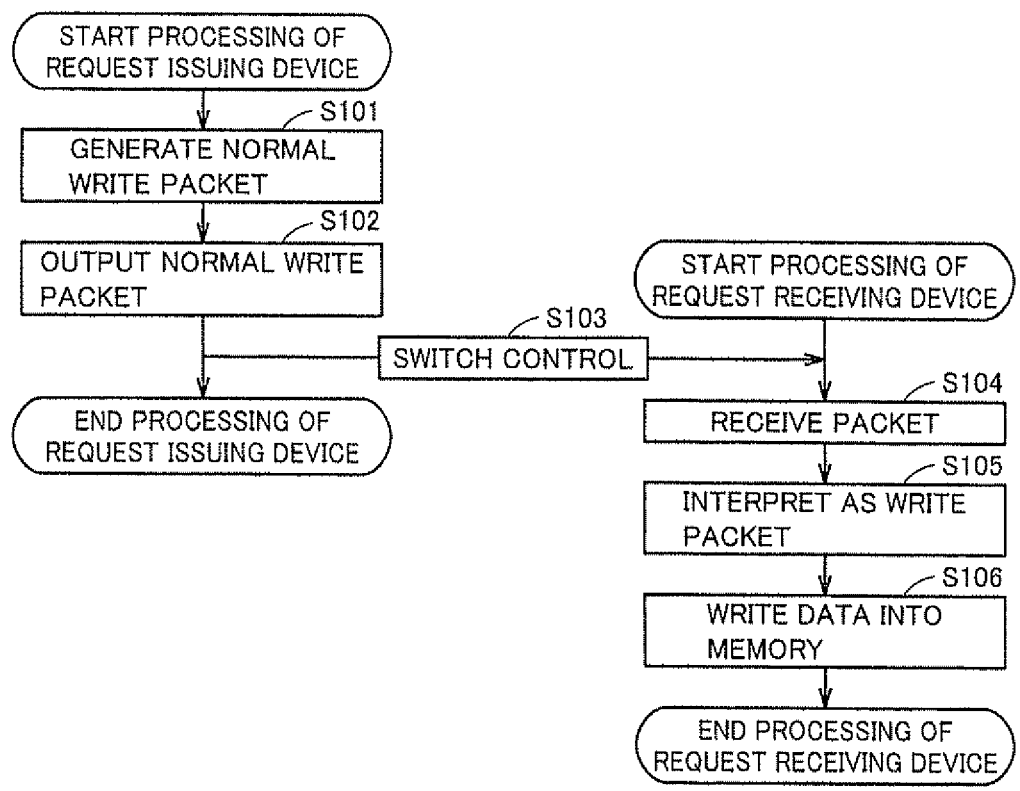
FIG. 5 is a flowchart showing the write operation procedure.

FIG. 5 is a flowchart showing the write operation procedure.

Referring to FIG. 5, write request unit 12 of request issuing device 10 first generates a normal write packet as shown in FIG. 4(b) (step S101).

Then, packet output unit 16 of request issuing device 10 outputs the normal write packet to multiport switch 1 (step S102).

Then, communication unit 4 of multiport switch 1 receives the normal write packet and stores the write packet in buffer 2. When the packets previously accumulated in buffer 2 no longer exist therein, priority control unit 3 extracts the write packet and outputs the packet to communication unit 4. It is to be noted that, even when buffer 2 still includes a read packet that precedes the write packet and is transferred from the same request issuing device as that of the write packet and transferred to the same request receiving device as that of the write packet, priority control unit 3 extracts the write packet prior to the read packet, and outputs the write packet to communication unit 4. Communication unit 4 outputs the write packet to request receiving device 20 (step S103).

Then, packet receiving unit 21 of request receiving device 20 receives the packet from multiport switch 1 (step S104).

Since the transaction type of the received packet is NWRITE, packet interpretation unit 22 of request receiving device 20 interprets the received packet as a write packet (step S105).

Then, write processing unit 24 of request receiving device 20 writes the write data included in the payload into memory 27 by the size designated in W_SIZE based on the memory address as the starting point that is designated in W_ADD of the received write packet (step S106).

[Normal Read Operation]

Figure 6:
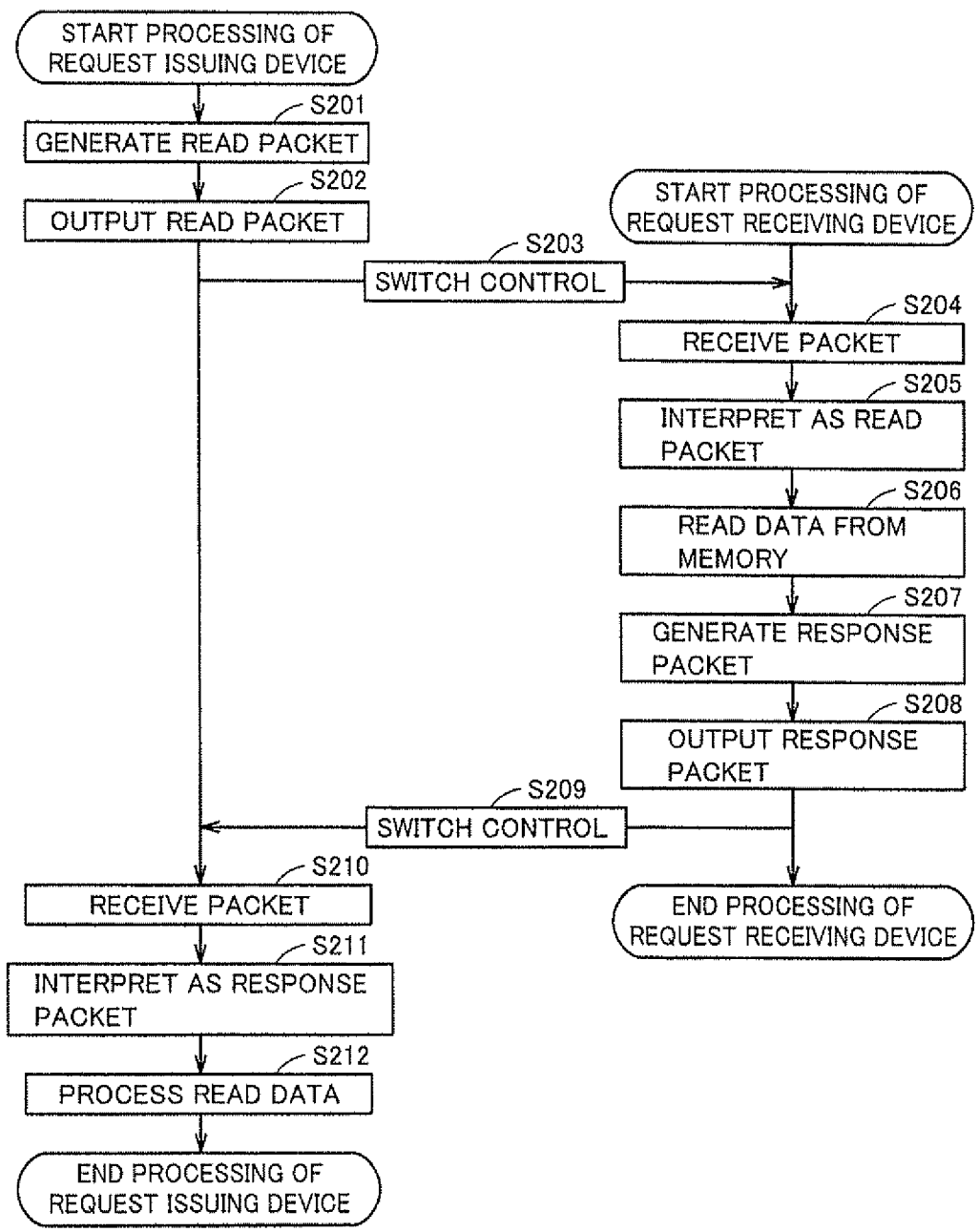
FIG. 6 is a flowchart showing the normal read operation procedure.

FIG. 6 is a flowchart showing the normal read operation procedure.

Referring to FIG. 6, normal read request unit 14 of request issuing device 10 first generates a read packet as shown in FIG. 4(a) (step S201).

Then, packet output unit 16 of request issuing device 10 outputs the read packet to multiport switch 1 (step S202).

Then, communication unit 4 of multiport switch 1 receives the read packet and stores the read packet in buffer 2. When there is no write packet in buffer 2 that is transferred from the same request issuing device as that of the read packet and transferred to the same request receiving device as that of the read packet and there is also no preceding read packet, priority control unit 3 extracts the stored read packet and outputs the read packet to communication unit 4. Communication unit 4 outputs the read packet to request receiving device 20 (step S203).

Then, packet receiving unit 21 of request receiving device 20 receives the packet from multiport switch 1 (step S204).

Since the transaction type of the received packet is NREAD, packet interpretation unit 22 of request receiving device 20 interprets the received packet as a read packet (step S205).

Then, read processing unit 25 of request receiving device 20 reads the data from memory 27 by the size designated in R_SIZE based on the memory address as the starting point that is designated in R_ADD of the received packet (step S206).

Then, read processing unit 25 of request receiving device 20 generates a response packet as shown in FIG. 4(*c*) (step S207).

Then, packet output unit 23 of request receiving device 20 outputs the response packet to multiport switch 1 (step S208).

Then, communication unit 4 of multiport switch 1 receives the response packet and stores the response packet in buffer 2. When there is no preceding packet in buffer 2, priority control unit 3 extracts the stored response packet and outputs the packet to communication unit 4. Communication unit 4 outputs the response packet to request receiving device 20 (step S209).

Then, packet receiving unit 7 of request issuing device 10 receives the packet from multiport switch 1 (step S210).

Since the transaction type of the received packet is RESPONSE, packet interpretation unit 18 of request issuing device 10 interprets the received packet as a response packet (step S211).

Then, normal read request unit 14 of request issuing device 10 extracts the read data from the payload of the received response packet (step S212).

[Specific Read Operation]

Figure 7:
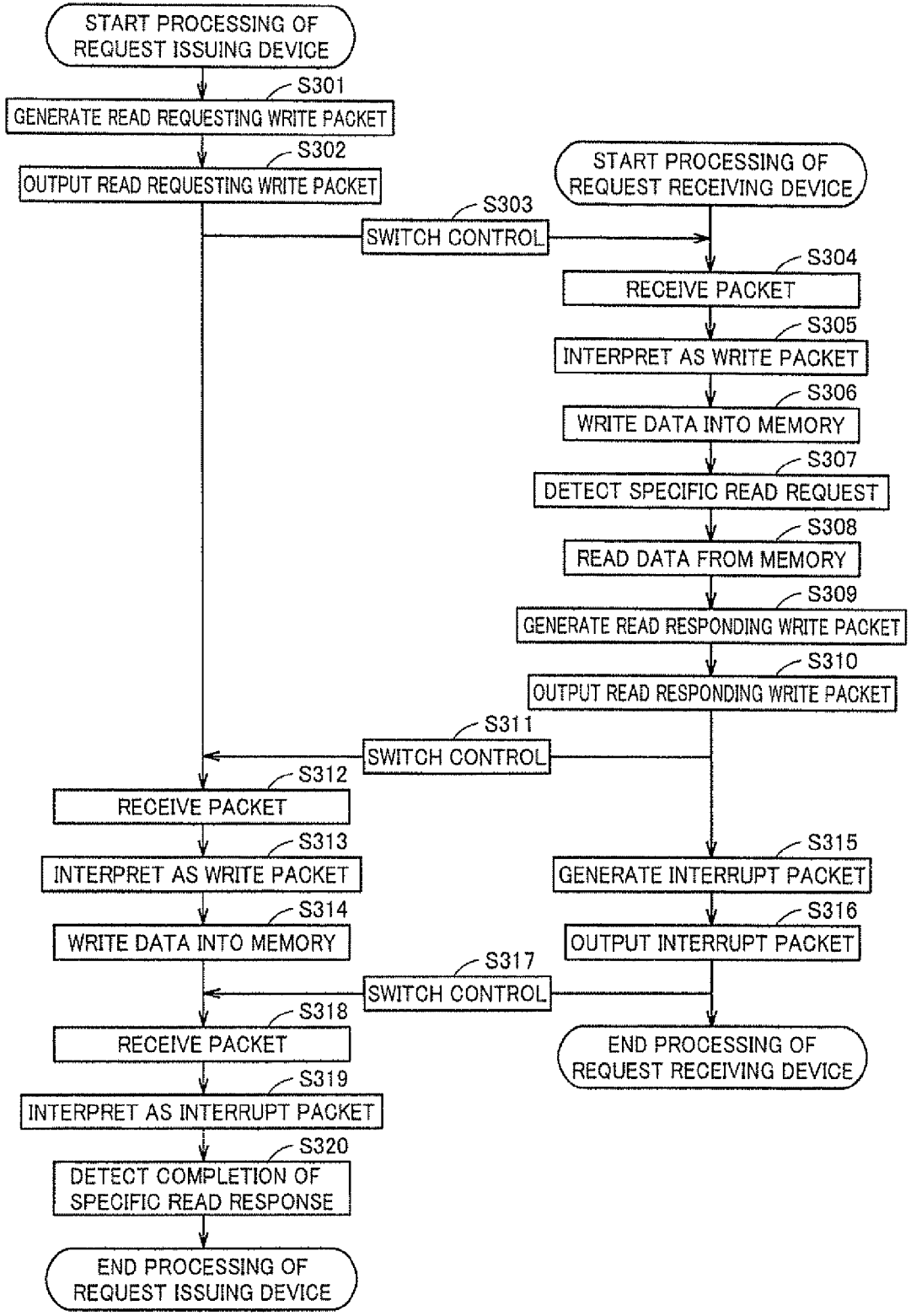
FIG. 7 is a flowchart showing the specific read operation procedure.

FIG. 7 is a flowchart showing the specific read operation procedure.

Referring to FIG. 7, specific read request unit 13 of request issuing device 10 first generates a read requesting write packet as shown in FIG. 4(*d*) (step S301).

Then, packet output unit 16 of request issuing device 10 outputs the read requesting write packet to multiport switch 1 (step S302).

Then, communication unit 4 of multiport switch 1 receives the read requesting write packet and stores the read requesting write packet in buffer 2. When the packets previously accumulated in buffer 2 no longer exist therein, priority control unit 3 extracts the read requesting write packet and outputs the packet to communication unit 4. It is to be noted that, even when buffer 2 still includes a read packet that precedes the write packet and is transferred from the same request issuing device as that of the write packet and transferred to the same request receiving device as that of the write packet, priority control unit 3 extracts the read requesting write packet prior to the read packet, and outputs this write packet to communication unit 4. Communication unit 4 outputs the read requesting write packet to request receiving device 20 (step S303).

Then, packet receiving unit 21 of request receiving device 20 receives the packet from multiport switch 1 (step S304).

Since the transaction type of the received packet is NWRITE, packet interpretation unit 22 of request receiving device 20 interprets the received packet as a write packet (step S305).

Then, write processing unit 24 of request receiving device 20 writes the data included in the payload into memory 27 by the size designated in W_SIZE based on the memory address as the starting point that is designated in W_ADD of the received write packet (step S306).

Since data is stored in the address "10000" within memory 27, specific read request responding unit 26 of request receiving device 20 detects reception of the specific read request (step S307).

Then, specific read request responding unit 26 of request receiving device 20 reads R_ADD, R_SIZE and RT_ADD each corresponding to the data written into the address "10000". Specific read request responding unit 26 reads the data from memory 27 by the size designated in R_SIZE based on the memory address as the starting point that is designated in R_ADD that has been read (step S308).

Then, specific read request responding unit 26 of request receiving device 20 generates a read responding write packet as shown in FIG. 4(*e*). Specific read request responding unit 26 uses the data in RT_ADD and R_SIZE read in step S308 as data in W_ADD and W_SIZE of the read responding write packet, and uses the read data read in step S308 as data in the payload (step S309).

Then, packet output unit 23 of request receiving device 20 outputs the read responding write packet to multiport switch 1 (step S310).

Then, communication unit 4 of multiport switch 1 receives the read responding write packet and stores the read responding write packet in buffer 2. When the packets previously accumulated in buffer 2 no longer exist therein, priority control unit 3 extracts the read responding write packet and outputs the packet to communication unit 4. It is to be noted that, even when buffer 2 still includes a read packet that precedes the write packet and is transferred from the same request issuing device as that of the write packet and transferred to the same request receiving device as that of the write packet, priority control unit 3 extracts the read responding write packet prior to the read packet, and outputs this write packet to communication unit 4. Communication unit 4 outputs the read responding write packet to request receiving device 20 (step S311).

Then, packet receiving unit 7 of request issuing device 10 receives the packet from multiport switch 1 (step S312).

Since the transaction type of the received packet is NWRITE, packet interpretation unit 18 of request issuing device 10 interprets the received packet as a write packet (step S313).

Then, write processing unit 15 of request issuing device 10 writes the write data included in the payload into memory 27 by the size designated in W_SIZE based on the memory address as the starting point that is designated in W_ADD of the received write packet (step S314).

Then, specific read request responding unit 26 of request receiving device 20 generates an interrupt packet as shown in FIG. 4(*f*) (step S315).

Then, packet output unit 23 of request receiving device 20 outputs the interrupt packet to multiport switch 1 (step S316).

Then, communication unit 4 of multiport switch 1 receives the interrupt packet and stores the interrupt packet in buffer 2. When there is no preceding packet in buffer 2, priority control unit 3 extracts the stored interrupt packet and outputs the packet to communication unit 4 (step S317).

Then, packet receiving unit 7 of request issuing device 10 receives the packet from multiport switch 1 (step S318).

Since the transaction type of the received packet is DOORBELL, packet interpretation unit 18 of request issuing device 10 interprets the received packet as an interrupt packet, and then outputs this interrupt packet to specific read request unit 13 (step 319).

Then, by receiving the interrupt packet, specific read request unit 13 of request issuing device 10 detects completion of the response to the specific read request (step S320).

As described above, according to the transmission system of the embodiment of the present invention, even when a read packet is lower in transmission priority than the write packet as in the case of Serial RapidIO (registered trademark), the write packet is used to write the read address of the memory of the destination device, the read size and the write address of the memory of the sender's device into the specified address of the destination device, which allows the read request to be delivered to the destination device without delay.

[Modification]

[1] Interruption

Figure 8:
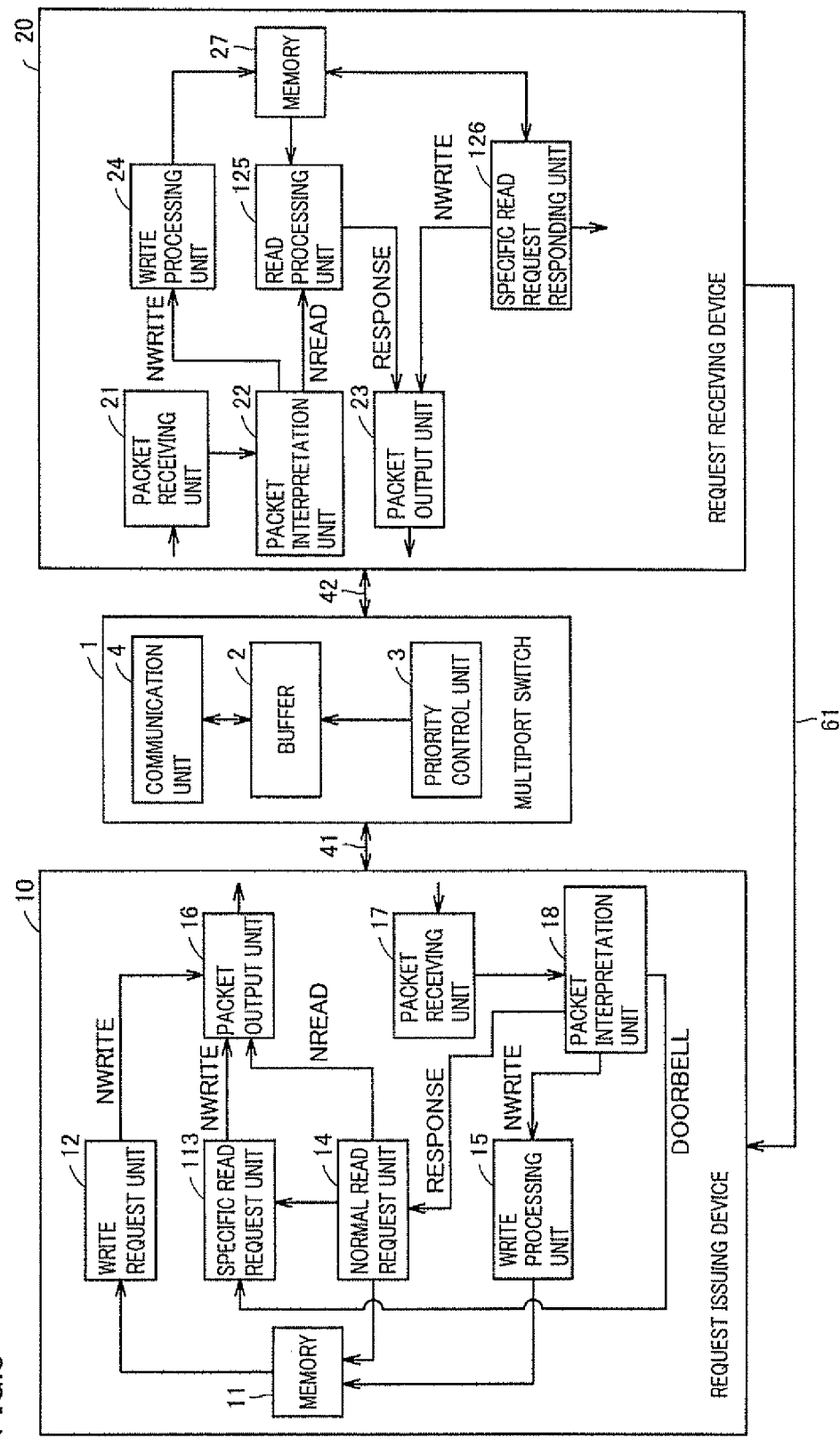
FIG. 8 is a diagram showing the configuration of a modification.
Figure 9:
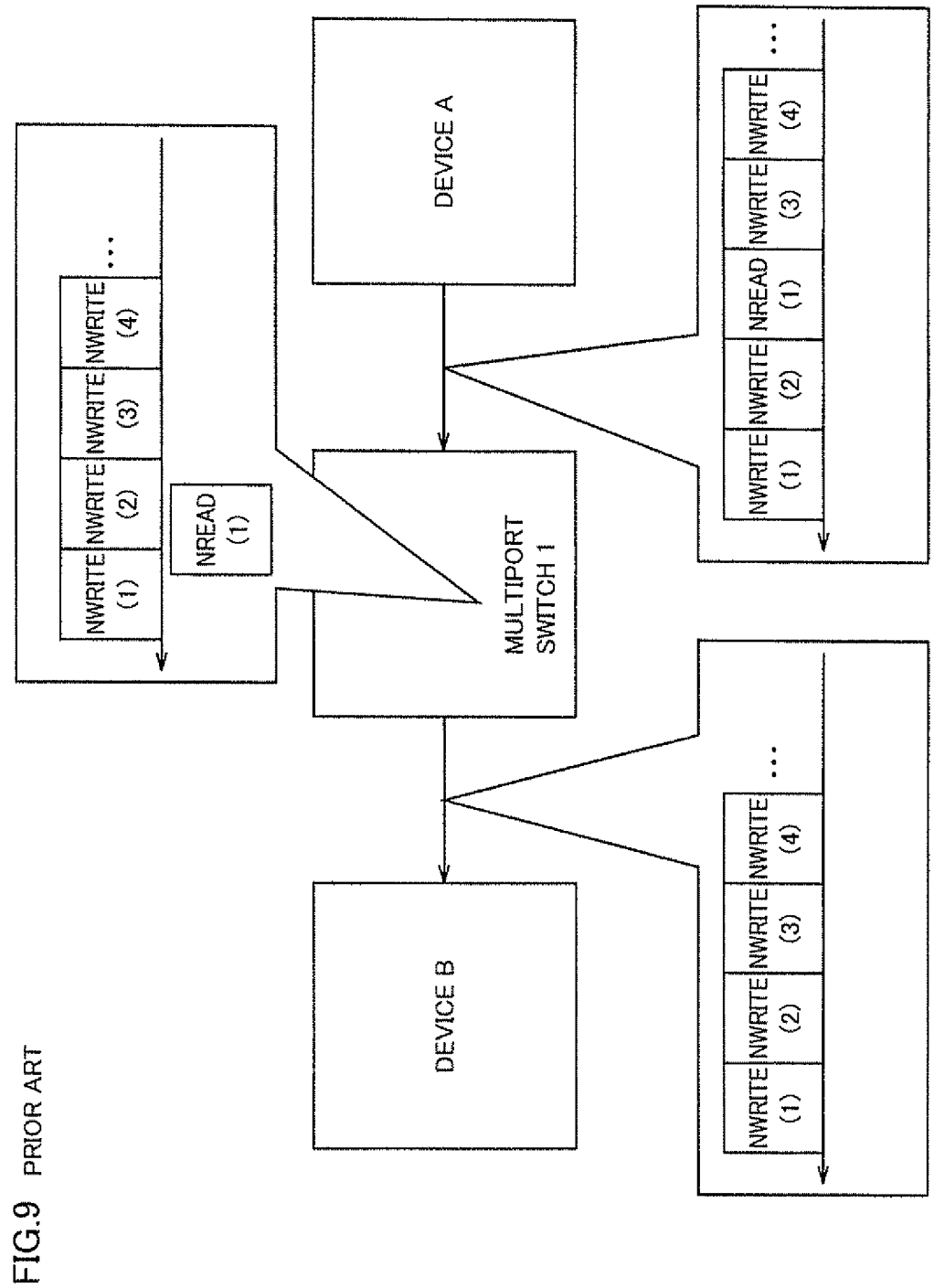
FIG. 9 is a diagram for illustrating a conventional example of packet transmission.

FIG. 8 is a diagram showing the configuration of a modification.

Referring to FIG. 8, the modification in FIG. 8 is different from the configuration of the embodiment in FIG. 3 in the following points.

First, request issuing device 10 and request receiving device 20 are directly connected to each other by an interrupt wiring 61. After generation of the read responding write packet, specific read request responding unit 126 notifies a specific read request unit 113 through interrupt wiring 61 about completion of the response processing to the specific read request.

[2] Request Issuing Device and Request Receiving Device

Although the embodiments of the present invention have been described to illustrate a configuration in which device 10 issues a read request and specific read and write requests which are received by device 20, the configuration is not limited thereto. Device A may issue these requests to device B at a certain point of time and may also receive these requests from device B or C at another point of time. In this case, device A includes both of the components of the request issuing device described in the embodiment of the present invention and the components of the request receiving device.

[3] Serial Bus

Although the embodiments of the present invention have been described to illustrate a configuration in which a device is connected through one serial bus to a port of a multiport switch, the configuration is not limited thereto. For example, the device may be connected through a plurality of serial buses to the port of the multiport switch.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

DESCRIPTION OF THE REFERENCE SIGNS 1 multiport switch, 2 buffer, 3 priority control unit, 4 communication unit, 10 request issuing device, 11, 27 memory, 13,113 specific read request unit, 14 normal read request unit, 15, 24 write processing unit, 16, 23 packet output unit, 17, 21 packet receiving unit, 18, 22 packet interpretation unit, 25 read processing unit, 26,126 specific read request responding unit, 61 interrupt wiring, 41, 42, 51, 52, 53, 54 serial bus, 90 substrate.

The invention claimed is:

1. A data transmission system comprising:
a multipart switch; and
a first device and a second device each connected to a port of said multiport switch through one or more serial buses,
said multiport switch including
buffer, and
a priority control unit, when said buffer includes a write packet and a read packet which are transferred to an identical transfer destination and transferred from an identical transfer source, providing an output of the write packet by priority,
said first device and said second device each including
a memory,
an output unit providing an output of a generated packet to said multipart switch,
a receiving unit receiving the packet from said multipart switch, and
a write processing unit writing data included in a payload of said received write packet into an address of the memory designated in a write address included in the received write packet,
said first device including
a read request unit generating a read requesting write packet including a predetermined address of the memory of said second device as a write address and including a read address of the memory of said second device in the payload, and
said second device including
a read response unit detecting reception of a read request when the data is written into the predetermined address of said memory, reading the data from the read address of the memory written into said predetermined address, and generating a read responding write packet including, in the payload, said data that has been read.

2. The data transmission system according to claim 1, wherein
in said first device,
said read request unit generates said read requesting write packet further including a read size in said payload, and
in said second device,
said read response unit reads the data from said memory by the read size written into the predetermined address of said memory, and generates said read responding write packet including the data read by said read size in the payload.

3. The data transmission system according to claim 1, wherein
in said first device,
said read request unit generates said read requesting write packet further including, in said payload, the address of the memory of said first device into which the data having been read is written, and
in said second device,
said read response unit generates said read responding write packet including, as the write address, the address of the memory of said first device written into the predetermined address of said memory.

4. The data transmission system according to claim 1, wherein
in said second device, said read response unit generates an interrupt packet providing notification of completion of a response to said detected read request after generation of said read responding write packet.

5. The data transmission system according to claim 4, wherein
in said first device,
when receiving said interrupt packet, said read request unit detects completion of the response to said read request.

6. The data transmission system according to claim 1, wherein
an interrupting wiring is further connected between said first device and said second device, and
in said second device,
said read response unit provides notification of completion of a response to said detected read request through said interrupt wiring after generation of said read responding write packet.

7. The data transmission system according to claim 6, wherein
in said first device,
when receiving the notification of completion of the response to said detected read request through said interrupt wiring, said read request unit detects completion of the response to said read request.

8. A method of reading data in a data transmission system including a multiport switch, and a first device and a second device each connected to a port of said multiport switch through one or more serial buses,
said multipart switch including a buffer, and a priority control unit, when said buffer includes a write packet and a read packet which are transferred to an identical transfer destination and transferred from an identical transfer source, providing an output of the write packet by priority, said method of reading data comprising the steps of:
said first device generating a read requesting write packet including a predetermined address of a memory of the second device as a write address and including a read address of the memory of said second device in a payload;
said first device transmitting said generated read requesting write packet to said second device through said multiport switch;
said second device receiving said read requesting write packet;
said second device writing data included in the payload of said received read requesting write packet into an address of the memory designated in the write address included in said received read requesting write packet;
when the data is written into the predetermined address of said memory, said second device detecting reception of a read request, reading the data from the read address of the memory written into said predetermined address, and generating a read responding write packet including, in the payload, said data that has been read;
said second device transmitting said generated read responding write packet to said device through said multiport switch; and
said first device receiving said read responding write packet.

* * * * *